United States Patent [19]

Bubniak et al.

[11] 3,996,906
[45] Dec. 14, 1976

[54] CONTROLLED EXHAUST GAS FUEL ATOMIZING NOZZLE

[75] Inventors: William C. Bubniak; William R. Matthes, both of Troy; Neil A. Schilke, Rochester, all of Mich.

[73] Assignee: General Motors Corporation, Detroit, Mich.

[22] Filed: Apr. 24, 1975

[21] Appl. No.: 571,417

[52] U.S. Cl. .................. 123/119 A; 123/119 R; 261/64 B; 261/69 R; 261/36 A; 239/408
[51] Int. Cl.² ......................... F02M 25/00
[58] Field of Search ............... 123/119 A, 119 R; 261/64 B, 69 R, 69 A, 36 A, DIG. 74; 239/453, 408

[56] References Cited
UNITED STATES PATENTS

| | | | |
|---|---|---|---|
| 2,394,664 | 2/1946 | Chander | 261/64 B |
| 3,800,769 | 4/1974 | Graffman | 261/36 A |

*Primary Examiner*—Charles J. Myhre
*Assistant Examiner*—R. H. Lazarus
*Attorney, Agent, or Firm*—Arthur N. Krein

[57] ABSTRACT

A fuel atomizing nozzle for use as a component part of a pressurized carburetor for an internal combustion engine in an automotive vehicle includes a housing forming part of the induction fluid passage through the carburetor, the housing having an inlet passage therein terminating at one end at an induction port, flow through which is controlled by a throttle-nozzle in the form of a poppet valve having a head and a stem, the stem being slidably received within a stepped valve guide bore in the housing, the guide bore having a stepped enlarged internal diameter adjacent to the induction passage to form, with the stem of the throttle-nozzle, a fuel discharge outlet, a fuel pressure regulator is associated with the housing to control fuel flow from a source of fuel under pressure to the fuel discharge outlet. An air-exhaust gas mixing valve has its outlet connected to the inlet passage in the housing, the mixing valve having an inlet for induction air and an exhaust inlet connectable to the exhaust system of the engine, a butterfly valve being positioned to control the flow of exhaust gases through the mixing valve, the butterfly valve being actuated by a linkage system operatively connected to the fuel pressure regulator whereby movement of the butterfly valve is controlled as a function of the fuel pressure in the fuel pressure regulator. The throttle-nozzle, in poppet valve form, functions as the primary throttle valve for the pressurized carburetor and is adapted to be operated by the usual throttle pedal control actuator by a vehicle operator.

5 Claims, 7 Drawing Figures

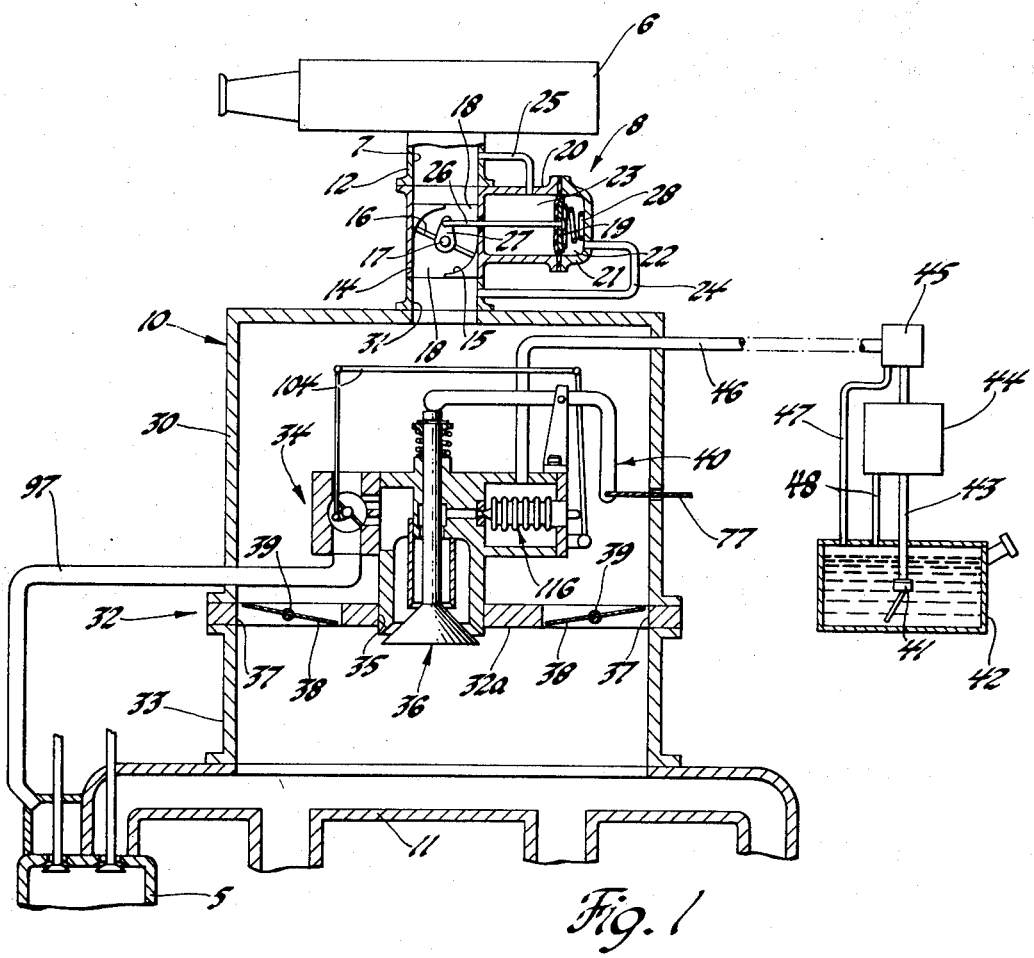
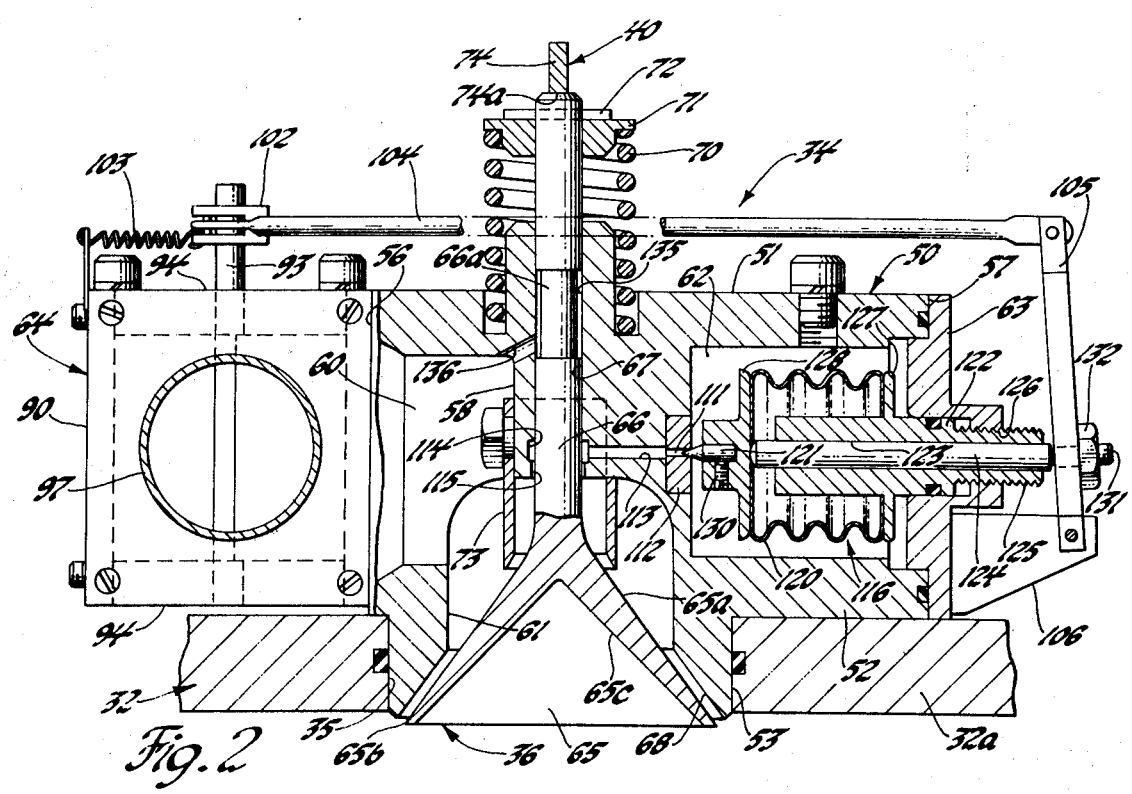

3,996,906

CONTROLLED EXHAUST GAS FUEL ATOMIZING NOZZLE

This invention relates generally to fuel injection type carburetors, commonly referred to as pressurized carburetors, and in particular to a fuel injection carburetor having a controlled exhaust gas fuel atomizing nozzle as a component thereof.

Fuel injection type carburetors, commonly referred to as pressurized carburetors, are so-called because fuel under pressure is injected into the induction passage of the carburetor.

An advantage of such a pressurized carburetor is that it may be positioned in the induction system for an engine at a considerable distance from the inlet ports of the individual cylinders of the engine, just like a conventional carburetor, and like a conventional carburetor can be connected to a common intake manifold serving a plurality of such cylinders. This, of course, is in contrast to the more conventional fuel injection systems of the type using a plurality of fuel injectors, each serving a single cylinder of the engine.

To increase fuel atomization in such a pressurized carburetor to enhance more efficient mixing of fuel and air, it is desirable to use a fuel nozzle of the atomizing type in which an auxiliary fluid, such as air, is used to facilitate breaking up of the liquid fuel into discreet particles. Thus, the use of a high velocity stream of air as an atomizing fluid is a common and effective means for achieving fuel atomization. A major factor affecting the degree of vaporization of the fuel is the temperature of the atomizing fluid. Thus, increased atomizing fluid temperature can promote faster vaproization and improve the quality of atomization. For use in the engine of an automotive vehicle, a well atomized or vaporized fuel can form a more homogeneous mixture with the induction air for better engine combustion.

It is therefore the primary object of this invention to provide an improved liquid fuel atomizer for use in supplying a combustible induction fluid mixture to an internal combustion engine.

Another object of this invention is to provide an improved pressurized carburetor for an internal combustion engine which incorporates therein an improved fuel atomizing nozzle.

A further object of this invention is to provide a fuel atomizing nozzle for use in a pressurized carburetor system for an internal combustion engine of an automotive vehicle whereby hot exhaust gases from the engine are substituted as part of the atomizing fluid for some of the relatively cold ambient air which is normally used.

Still, another object of this invention is to provide a fuel atomizing nozzle for use in the pressurized carburetor in an internal combustion engine for an automotive vehicle whereby exhaust gases are used as one of the fluids to effect atomization of the fuel delivered to the engine, with the flow of exhaust gases for atomization being controlled by a bellows-type fuel pressure regulator controlling fuel flow to the atomizing nozzle.

A still further object of this invention is to provide a controlled exhaust gas fuel atomizing nozzle for use as part of a pressurized carburetor for an internal combustion engine whereby the atomizing nozzle, in the form of a poppet valve, functions as the primary throttle valve of the carburetor.

These and other objects of the invention are obtained by a fuel atomizing nozzle used as part of a pressurized carburetor, that includes an atomizer throttle-nozzle, a fuel pressure regulator, an air-exhaust gas mixing valve and a linkage system which automatically actuates the mixing valve in response to a fuel pressure signal provided by the fuel pressure regulator controlling fuel flow to the atomizer throttle-nozzle to effect controlled flow of exhaust gases to thereby promote vaporization of atomized fuel, the atomizer throttle-nozzle, in the form of a poppet valve, functioning as the primary valve of the carburetor.

For a better understanding of the invention, as well as other objects and further features thereof, reference is had to the following detailed description of the invention to be read in connection with the accompanying drawings, wherein:

FIG. 1 is a schematic illustration of the fuel-air metering and induction system of an internal combustion engine utilizing a pressurized carburetor and a mass air flow meter in the system, the pressurized carburetor having a controlled exhaust gas fuel atomizing nozzle, in accordance with the invention, incorporated therein;

FIG. 2 is a view of a portion of the pressurized carburetor of FIG. 1 with parts in section to show specific details of the air-exhaust gas fuel atomizing nozzle structure;

Figure 3:
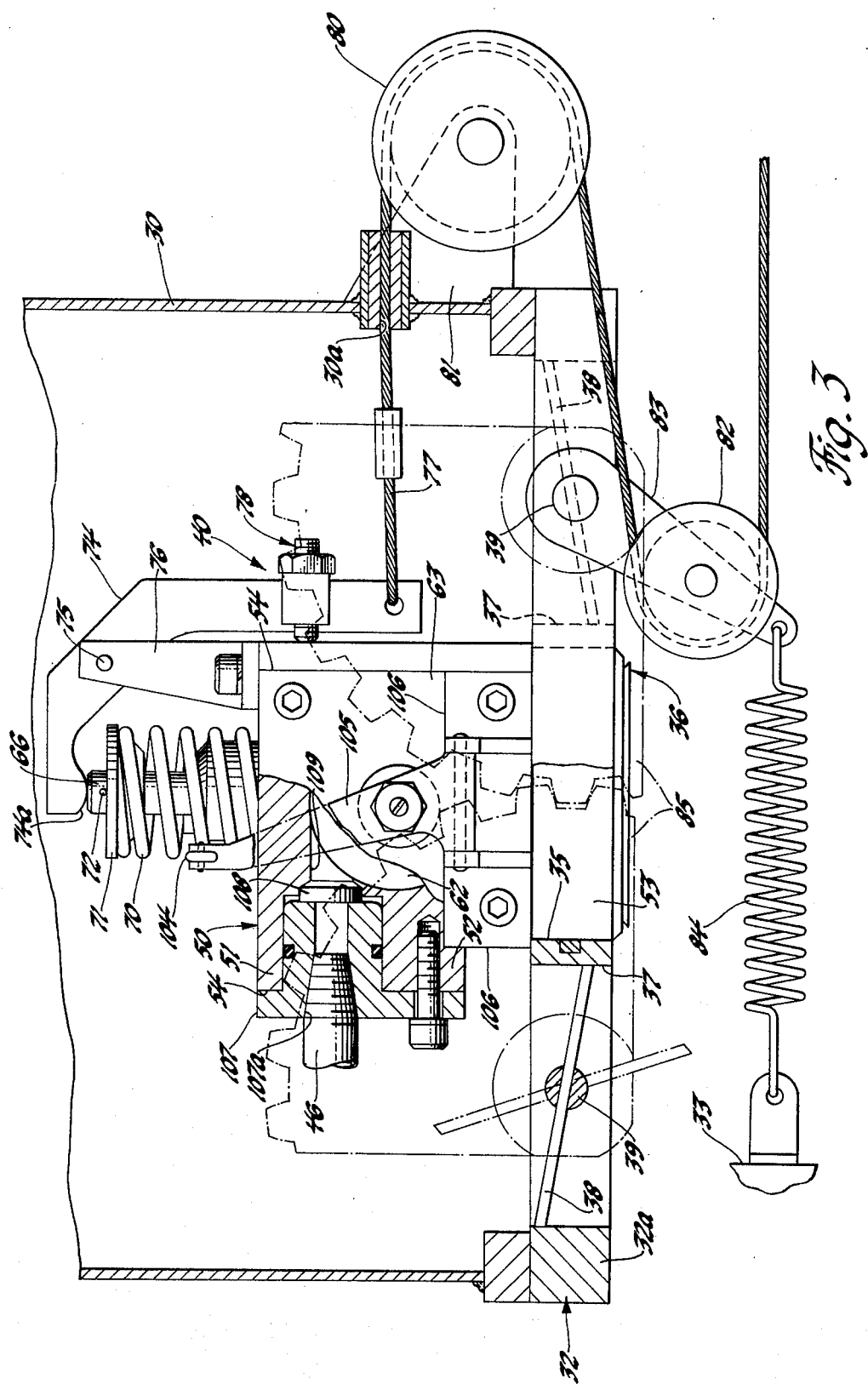
FIG. 3 is a sectional view of the pressure carburetor of FIG. 1 with parts broken away to show details of the structure and, specifically, of the linkage mechanism for actuation of the primary throttle which is part of the air-exhaust gas fuel atomizing nozzle and for operation of the secondary throttles of the carburetor.
Figure 4:
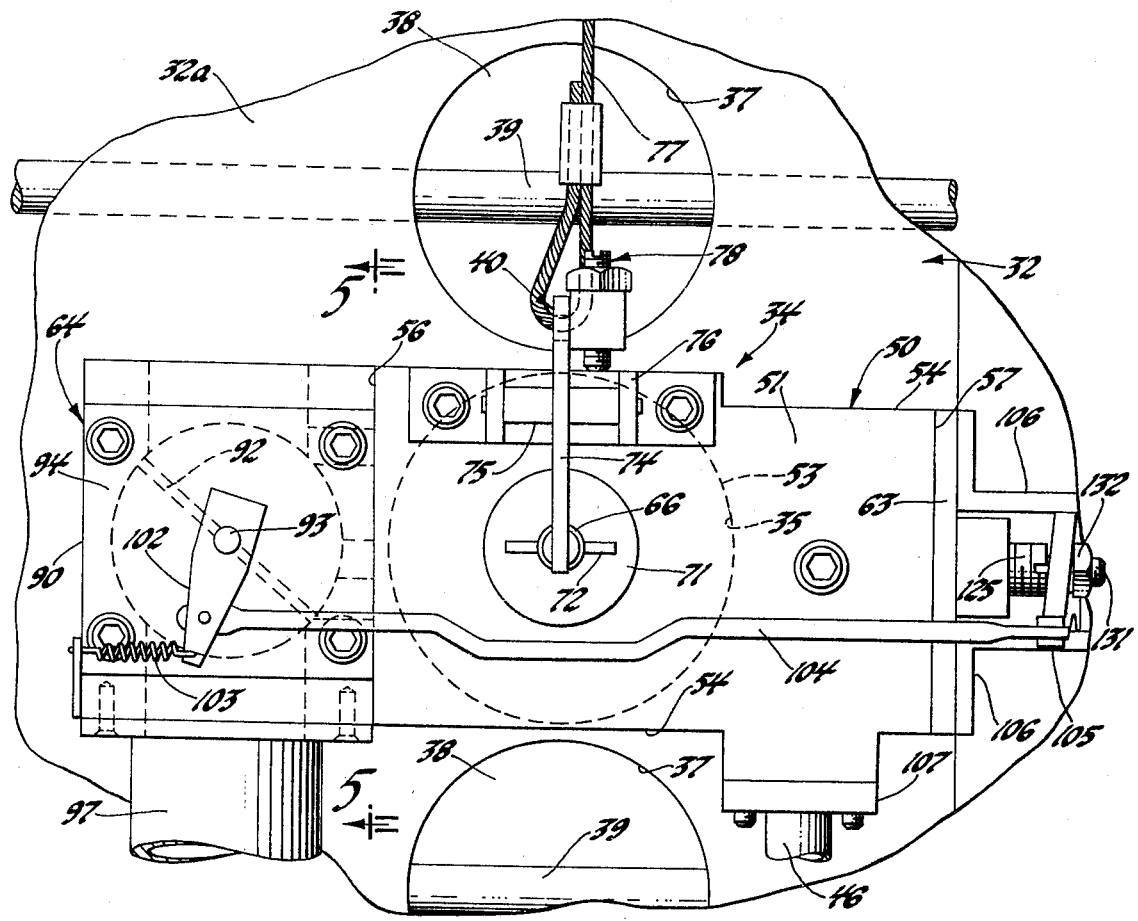
FIG. 4 is a top view of the throttle body portion of the pressurized carburetor containing the air-exhaust gas fuel atomizing nozzle and secondary valves of the carburetor.

Referring first to FIG. 1, there is shown schematically the fuel-air metering and induction system of an internal combustion engine. Air is supplied to an internal combustion engine 5 through an air filter 6 into the induction passage 7 having an air meter assembly, generally designated 8, therein and then through a throttle controlled pressurized carburetor or air induction unit, generally designated 10, by which an induction charge is supplied through the intake manifold 11 of the engine to the various cylinders of the engine.

The air meter 8 is preferably of the type disclosed in U.S. Pat. No. 3,817,099 entitled "Mass Flow Air Meter" issued on June 18, 1974 in the names of William C. Bubniak, Louis W. Huellmantel and Harry R. Mitchell, the disclosure of which is incorporated herein by reference thereto. As shown, the air meter includes an air horn 12 and an air valve body 14 having a cross bore 15 therein. A butterfly valve 16 mounted on a shaft 17 journalled for rotation in the valve body coaxial with cross bore 15 is used to control air flow through a pair of contoured holes 18 of continuous profile extending from opposite sides of the valve body 14 and running out at the cross bore 15, one of the contoured holes being inverted with respect to the other contoured hole. The valve 16 is operated by a servo mechanism, to be described, which derives its power from the air pressure drop across the valve 16.

The servo mechanism used to position the valve 16 of the air meter to maintain essentially a constant depression across this valve, as desired, over most of the range of engine operation is shown schematically in FIG. 1 and includes a diaphragm 19 mounted between the housing portion 20 of the air meter body and a cover 21 and forming therewith chambers 22 and 23 on opposite sides of the diaphragm. Chamber 22 is connected by a conduit 24 to the induction passage downstream of the valve 16, while chamber 23 is connected by a conduit 25 to the induction passage 7 upstream of the valve 16. A control rod 26 is fixed at one end to the diaphragm 19 for movement therewith, this rod extending through a seal aperture in the housing portion 20 with its opposite end then pivotally connected to a lever arm 27 operatively fixed to the valve 16, as by being secured to one end of the valve shaft 17. A spring 28 of predetermined force, as desired, is positioned to normally bias the diaphragm and, therefore the valve 16 to a neutral position. With this arrangement, any change in the depression across the air valve 16 will be detected by the servo mechanism and the rotated position of the air valve will be adjusted accordingly.

The charge forming device or pressurized carburetor 10, in accordance with conventional carburetor practice, is fabricated as an assembly of various subassemblies. In the embodiment illustrated, the pressurized carburetor 10 includes an air horn body 30 having an induction passage 31 in communication with the induction passage 7 downstream of the air meter 8, a throttle body assembly, generally designated 32, and a manifold mounting body 33 for mounting the carburetor on the inlet manifold 11, these components being suitably secured together in a unit assembly.

Primary induction flow from the pressurized carburetor is controlled by means of a controlled exhaust gas fuel atomizing nozzle or simply fuel atomizing nozzle, generally designated 34, constructed in accordance with the invention, mounted on the throttle body or plate 32a of the throttle body assembly, with a portion of the fuel atomizing nozzle extending through a central aperture 35 in the throttle plate 32a. The fuel atomizer 34 has a throttle-nozzle 36 therein in the form of a poppet valve, to be described hereinafter, which serves as the primary throttle valve of the carburetor.

In addition, the throttle plate 32a is provided with a pair of secondary air passages 37, flow through which is controlled by the pair of secondary throttle valves 38, each being fixed to a throttle shaft 39 journalled in the plate 32a. Both the primary and secondary throttle valves are adapted to be operated by a vehicle operator through the usual throttle pedal control, not shown, which is connected to a throttle actuator linkage, generally designated 40, to be described in detail hereinafter.

Fuel for the engine 5 is delivered at a relatively low pressure by a fuel pump 41 from a fuel reservoir 42 to a supply conduit 43. Fuel passes from the conduit 43 to the inlet side of a fuel pump, such as, high pressure, variable displacement, engine driven fuel pump 44, the fuel pump discharging fuel at a relatively high pressure to the fuel metering valve 45 which regulates the flow of fuel to a conduit 46 for delivery to the fuel inlet port of the fuel atomizing nozzle 34, to be described hereinafter. Excess fuel delivered by the fuel pump 44 to the fuel metering valve 45 is returned from the fuel metering valve 45 to the fuel reservoir 42 via conduit 47 and an orifice conduit 48 returns fuel from the stator cavity of fuel pump 44.

The fuel pump 44 and fuel metering valve 45 are used to regulate the flow and pressure of fuel delivered to the fuel atomizer 34 as a function of engine operating conditions and, accordingly, would in turn be operatively regulated in a suitable manner, for example, by any one of a number of known electrical control systems, not shown. Such a system would be adapted to monitor various engine operating parameters and to provide a control signal to, for example, the fuel metering valve, which is determinative of the pressure of fuel and, therefore, the flow of fuel to be supplied to the engine to run the engine at a predetermined air-fuel ratio for the operation condition of the engine.

The details of the fuel pump 44, fuel metering valve 45 and the control system, not shown, are immaterial to the subject invention, may take any desired form and, therefore, need not be described in detail. Preferably, the fuel pump 44 and fuel metering valve 45 are combined into an integrated unit and may, for example, be of the type disclosed in United States Patent Office published application B419,481, entitled "Electrically Controlled Fuel Pump," published Jan. 28, 1975, in the names of Ralph H. Johnston and Leroy E. Lakey, the disclosure of which is incorporated herein by reference thereto.

Referring now to the fuel atomizing nozzle 34 of the invention, it includes a throttle-nozzle atomizer, a fuel pressure regulator, an air-exhaust gas mixing valve and a linkage system, all to be described in detail hereinafter. For ease in manufacturing, the air-exhaust gas mixing valve is fabricated as a separate assembly to be attached to a main atomizer assembly that includes a housing 50, of open-ended, substantially box-like construction, having a top wall 51, a bottom wall 52 having a depending tubular portion 53 adjacent one end thereof, spaced apart side walls 54, spaced apart open ends 56 and 57 and a central partition wall 58, defining an inlet passage 60 extending from one end 56 into communication with one end of the cylindrical passage 61 in tubular portion 53, the opposite end of the cylindrical passage 61 terminating at an inlet port positioned on the bottom or downstream side of the throttle plate 32a for discharge of induction fluid into the manifold 11. The above-identified elements of the housing also define a chamber 62 extending from end 57 to partition wall 58, the chamber being partly closed at the end 57 by an end plate 63 suitably secured to the end 57 of the housing. As described in detail hereinafter, the fuel pressure regulator of this assembly is suitably housed within chamber 62 and defines therewith a fuel chamber.

The air-exhaust valve or mixing valve, to be described, and generally designated 64, is secured to the end 56 of the housing 50 with its outlets in communication via inlet passage 60 and cylindrical passage 61, with the engine, the flow through the cylindrical passage 61 being controlled by the atomizer throttle-nozzle 36. The cylindrical passage 61 terminates at an annular valve seat 68, inclined at an angle to the axis of passage 61 which defines the primary inlet port to the engine.

The throttle-nozzle 36, in the form of a poppet valve, includes a hollow frusto-conical head 65 and a stem 66 extending from the backside of the head. The stem 66 is reciprocally received within a stem guide or valve guide bore 67 in the partition wall 58 concentric with passage 61 and the free end of the stem extends outward from the top wall 51 of the housing 50 in position to be actuated, in one direction, by an element of a throttle actuator linkage in a manner to be described.

The throttle-nozzle 36 is normally biased in a direction toward seating engagement of the head thereof relative to the annular valve seat 68 in the tubular portion 53 to restrict flow out through the inlet port, by means of a light coiled spring 70 abutting at one end against the housing 50 and at its other end against a spring retainer 71 suitably secured against axial movement in one direction relative to the stem, as by means of a pin 72 inserted through a suitable aperture provided for this purpose in the stem adjacent to the free end thereof.

A tubular air shield 73, slotted at its upper end, is suitably secured to the lower semi-circular portion of the partition wall 58 in position to concentrically encircle the stem 66 of the throttle-nozzle 36 directly above its head 65 when it is biased by the spring 70 towards its seated position.

The throttle actuator linkage 40, used to effect operation of the throttle-nozzle 36, which serves as the primary throttle valve, and to effect operation of the secondary throttle valve 38, includes, as best seen in FIG. 3, a rocker arm 74 pivotally supported intermediate its ends by a pivot pin 75 in the spaced apart arms of a pivot support 76 fixed to the top of the housing 50 whereby the pilot end 74a of the rocker arm is positioned to engage the top of the valve stem 66. The opposite end of the rocker arm is secured to one end of a flexible accelerator cable 77, the opposite end of which is operatively connected to a conventional accelerator pedal, not shown, whereby the rocker arm can be pivoted in one direction, in a counter-clockwise direction as seen in FIG. 3, to effect opening movement of the throttle-nozzle 36. The rocker arm 74 is also provided with an adjusting screw arrangement 78 for setting the idle position of the throttle-nozzle 36, a position in which the valve head 65 is just slightly unseated from valve seat 68, as shown in FIG. 2.

As seen in FIG. 3, the accelerator cable 77 extends through a suitable aperture 30a in the air horn body 30 partly around a pulley 80 pivotally supported on a bracket 81, then partly around an idler pulley 82 and then to the accelerator pedal, not shown. The idler pulley 82 is pivotally supported intermediate the ends of a secondary throttle lever 83 fixed at one end to the throttle shaft 39 for one of the secondary throttle valves 83, the right-hand secondary throttle valve as shown in FIG. 3. The opposite end of the secondary throttle lever 83 is fixed to one end of a throttle return spring 84, the opposite end of the throttle return spring being connected to a fixed element, such as the manifold mounting body 33. The secondary throttle valves 38 are rotated in opposite directions, but in synchronization with each other, by a pair of engaged segmented gears 85 suitably fixed to the throttle shafts 39.

The biasing force of the throttle return spring 84 is sufficiently greater than the biasing force of spring 70 so that during operation of the accelerator cable 77, in a direction to effect opening of the throttle valves, the rocker arm 74 is permitted to pivot first to effect full opening movement of the throttle-nozzle 36 before the force of spring 84 is overcome to then permit pivotal movement of the secondary throttle lever 83 in a direction, counterclockwise with reference to FIG. 3, to effect opening movement of the secondary throttle valves 38. Of course, when the accelerator pedal is released, spring 84 would first effect closing movement of the secondary throttle valves 38 and then, after the throttle lever has assumed the position shown in FIG. 3, closure of the throttle-nozzle 36 would occur.

Referring now to FIGS. 2, 4, 5 and 6, the air-exhaust valve 64 of the subject fuel atomizing nozzle 34 of the invention consists of a valve housing including a valve body 90 having a straight through bored hole therein to provide an inner peripheral wall 91, the bore being of a suitable internal diameter to rotatably receive a rectangular flat valve plate 92 suitably mounted on a shaft 93 for pivotal movement therewith. A pair of side plates or covers 94, suitably secured to the valve body 90, seal the bored hole at opposite ends thereof and also serve to rotatably support the shaft 93 whereby the shaft is positioned for pivotal movement about an axis corresponding to the axis of the bore in the valve body. The inner peripheral wall 91 and the inner surface of the covers 94 thus define a cylindrical cavity in the valve housing.

Figure 5:
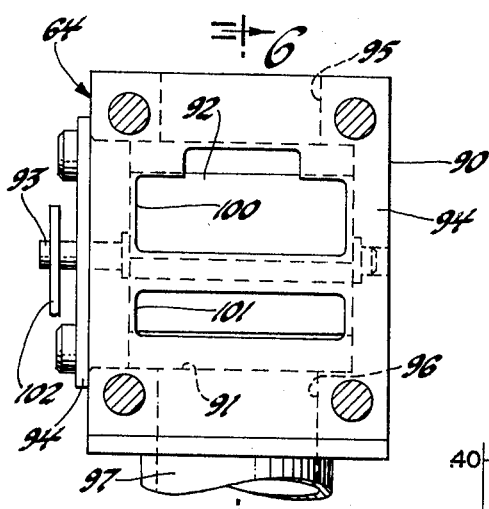
FIG. 5 is a view taken along line 5—5 of FIG. 4 illustrating the configuration of the contoured holes forming the outlet ports of the air-exhaust mixing valve of the air-exhaust gas fuel atomizing nozzle.
Figure 6:
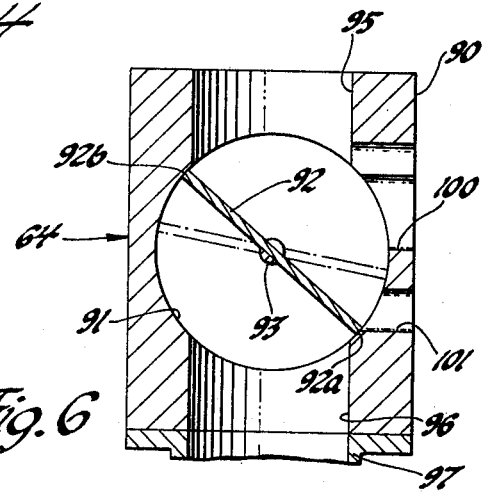
FIG. 6 is a view taken along line 6—6 of FIG. 5.

As best seen in FIGS. 5 and 6, the body 90 is provided with a hole or passage 95 extending from one surface of the housing to run out at the wall of the cross bore to serve as the air inlet, this passage being in communication with the interior of the air horn body 30 to receive induction air downstream of the air meter assembly 8. The body 90 is also provided with a second passage 96 extending from the opposite surface of the housing, diametrically opposite the passage 95, the second passage 96 also running out at the wall of the cross bore. This second passage 96 serves as an exhaust gas inlet to the valve housing and is connected as by a conduit 97 to the exhaust manifold of the engine 5, the conduit 97 extending through a suitable aperture provided for this purpose in the air horn body 30.

At right angles to the passages 95 and 96, the valve body is provided with a pair of spaced apart contoured holes 100 and 101 of continuous profile which run out at the cross bore, the upper hole 100, as seen in FIGS. 5 and 6, serves as the air outlet from the valve while the bottom hole 101 serves as the exhaust gas outlet from the valve, both outlets discharging into the inlet passage 60 of housing 50.

The profile of the hole 101 can be contoured, as desired, to provide for a flow area to provide the desired exhaust flow characteristics for a particular engine. The contoured hole 101 is thus profiled to provide an exhaust gas scheduled flow area in square inches which is, in effect, continuously varied by movement of valve plate 92 to provide the desired exhaust gas flow rates in the manner described in copending United States patent application patent No. 3,901,203 entitled "EGR System" filed July 23, 1973 in the name of Donald J. Pozniak. The contoured hole 100 forming part of the air passage through the valve is of a desired area to provide the desired air flow for the engine. As disclosed in the above referenced United States patent application, the included angle in the cross bore for the fluid flow path between the passage 96 and hole 101, with the valve plate 92 in full open position relative to these holes, is less than 180°.

As best seen in FIG. 6, the valve plate 92 is centered on the shaft 93 to provide a balanced butterfly arrangement whereby the valve plate may be pivoted with a minimum power force through a suitable linkage system, to be described, which includes a valve actuator lever 102 fixed to one end of the shaft 93.

The rotative extent of travel of the valve plate 92 is limited, in a suitable manner, to a predetermined number of degrees whereby, the flow control edge 92a of this valve plate would be permitted to travel between a closed position, shown in solid line in FIG. 6, and a fully open position, shown in broken line in FIG. 6, relative to the contoured hole 101. At the same time, the sealing edge 92b of the valve plate would only traverse non-apertured portions of the wall 91 so as to prevent fluid flow around this edge of the valve. During movement of the valve plate 92 between the closed position and the open position, as described above, the outlet hole 100 is always in direct communication with the passage 95 to permit the free flow of induction ambient air into the inlet passage 60.

In operation, as the valve plate 92 is rotated toward the open position, in a counterclockwise direction with reference to FIG. 6, an exhaust gas recirculation flow area in uncovered which is defined by a segment of the wall formed by the contoured hole 101 in the valve body 90 and the radial edge 92a of the valve plate. Thus, the scheduling of the exhaust gas recirculating flow area to meet a specific flow area characteristic for a given engine is achieved by defining the shape of the contoured hole 101 for a given flow rate, as desired, together with appropriate movement of the valve plate, in a manner to be described.

The valve plate 92 is normally biased toward the closed position by means of a coiled spring 103 fixed at one end to the actuator lever 102 and, at its other end, rigidly fixed to the valve body 90 in a suitable manner. Movement of the valve plate 92 in the opposite direction, that is, from a closed position toward the open position, is effected by means of the linkage system which includes the actuating lever 102, a lever 104 pivotally fixed at one end to the valve actuating lever 102 and at its opposite end is pivotally connected to one end of a pivot lever 105 that is suitably pivotally supported at its opposite end between a pair of support brackets 106 fixed to the end plate 63 of housing 50. Pivotal movement of the pivot lever 105 is effected as a function of fuel pressure within the fuel chamber 62 of housing 50 in a manner to be described.

Referring now to FIGS. 2 and 3, fuel chamber 62 in the housing 50 is supplied with fuel via the conduit 46, the discharge end of this conduit being threadingly engaged in the threaded end of a passage 107a in a fuel adapter inlet plate 107 fixed to one side of the housing 50, for the discharge of fuel through a filter 108 into a passage 109 in housing 50 in communication with the chamber 62. Fuel flow from the chamber 62 is controlled by a fuel pressure regulator, generally designated 116, carrying a tapered metering rod 121 which controls fluid flow from the chamber through a metered orifice passage 111, in the orifice 112 fixed in the partition wall 58, the orifice passage 111 being in communication with a passage 113 in the partition wall 58 of the housing. The passage 113 extends to an annular recess 114, of a predetermined diameter, in the wall 58 concentric with the valve guide bore 67, this recess 114, in turn, is in communication with an adjacent annular recess 115 of smaller diameter concentric with the valve guide bore 67 extending to the cylindrical passage 61. The valve guide in the housing 50 is thus in effect a stepped bore extending through the partition wall 58.

The recesses 114 and 115 form with the outer periphery of the valve stem 66 a first enlarged annulus chamber for relatively unrestricted flow of fuel received from chamber 62 via orifice 111 and passage 113 and, a second annulus chamber of reduced size downstream of the first annulus chamber and adjacent the lower end of partition wall 58 adapted to deliver a thin film of fuel into a control region along the outer peripheral surface of the valve stem 66 to flow down thereon onto the head 65 and is dispersed so as to wet the relatively large surface area on the back side of the valve head 65. At the same time, a mixture of air and hot exhaust gases, entering through the passage 60, flows into the control region in passage 61 adjacent to the air shield 73 to effect vaporization and atomizing of the fuel and then the discharge of this induction mixture through an annular flow inlet opening between the throttle-nozzle 36 and the valve seat 68.

As seen in FIG. 2, the outer peripheral surface 65a of the head 65 is conically formed and terminates at its free end, the lower end with reference to this figure, in a relatively sharp edge 65b which forms a release edge for liquid fuel. In the embodiment shown, the non-active or front surface 65c, of the valve head facing away from the valve seat 68, is conically recessed, but can be of any desired configuration to provide the desired release edge.

As previously described, fuel flow from the chamber 62 through the orifice 111 is controlled by the bellows-type fuel pressure regulator 116 which includes a tubular bellows 120 fixed at one end and having its opposite or movable end carrying the uniformly tapered metering rod 121 that is positioned concentric to the orifice 111 and movable relative thereto, as seen in FIG. 2, to control the discharge of fuel from chamber 62 through this orifice. As seen in this figure, the pressure regulator also includes a tubular regulator body 122 having a cylindrical passage 123 therethrough to slidably receive a control pin 124, the regulator body being provided at one end of reduced diameter with threads 125 whereby the regulator body is sealingly and adjustably received in a threaded aperture 126 in the end plate 63 provided for this purpose. The regulator body 122 is also provided with a radially extending flange 127, positioned inside the chamber 62, against which one end of the tubular bellows 120 is fixed, thus defining the fixed end of bellows 120. The opposite or free end of the bellows 120 has a bellows head 128 fixed thereto for movement therewith. The metering rod 121 is suitably secured, as by set screw 130, in the free end of the bellows head 128. The control pin 124, as shown, is of an axial extent greater than the axial length of the regulator body 122 whereby one end of this pin can abut against the front or bellows head 128 end of the bellows 120 while the opposite end of the pin extends outward from the regulator body to abut against the pivot lever 105 intermediate the ends thereof, as by engagement of the pin against an adjustable abutment 131 threaded into a suitable threaded aperture in the lever 105 and locked by a lock nut 132.

The linkage system for effecting operation of the valve plate 92 of the air-exhaust valve 64, and therefore control of exhaust gas recirculation, operates as follows: Fuel under pressure entering the fuel chamber 62 of the housing 50 acts against the bellows assembly of the fuel pressure regulator 116, the inside of the bellows 120 being vented to the atmosphere by the clearance between the control pin 124 and the cylindrical passage 123 in the regulator body 122. As previously described, the control pin bears against the bellows floating head at one end and against the lever 105 on the other end. By this means, the bellows 120 is used to convert fuel pressure signals into controlled movement of the control pin 124 which acts through the linkage system to effect operation of the valve 92. The action of the bellows under load is similar to that of a helical spring. Equal increments of fuel pressure differential result in bellows travel of equal distances. Thus, the stroke of the control valve linkage system follows the same curve (straight line) for increasing or decreasing fuel pressure. Since the valve plate 92 is pressure balanced, the bellows travel, for all practical purposes, is a function of fuel pressure only.

Figure 7:
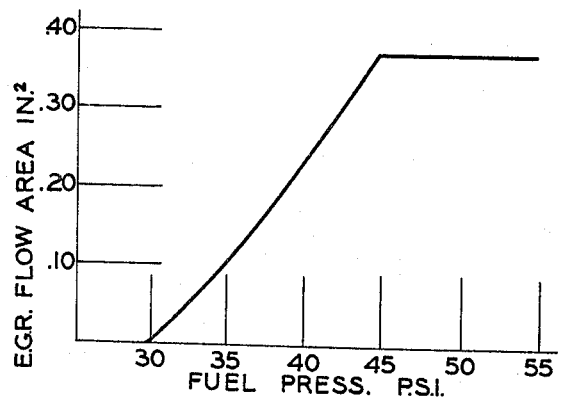
FIG. 7 is a graph illustrating the exhaust gas recirculation flow area uncovered for the air-exhaust gas mixing valve as a function of the fuel pressure in the air-exhaust gas fuel atomizing nozzle.

More specifically, since fuel pressure in the chamber 62 is related linearly to fuel flow by the characteristic shape of the fuel metering orifice as defined by orifice 111 and the shape of metering rod 121, fuel pressure can be directly related to engine air flow under constant air-fuel ratio conditions. Therefore, the control linkage can be sized and the air-exhaust mixing valve can be proportioned so that the required amount of exhaust gas is delivered to the throttle-nozzle control region according to any predetermined exhaust gas recirculation schedule based on engine air flow requirements. In FIG. 7, there is shown a sample graph illustrating the exhaust gas recirculation (E.G.R.) flow area in inches uncovered by the valve plate 92 as a function of the fuel pressure in chamber 62 as sensed by the bellows assembly of the fuel pressure regulator. It should be realized that the flow area can be scheduled, as desired, to obtain the desired exhaust gas recirculation for a given engine. In addition, the fuel pressure at which the valve plate 92 will crack open can be set, as desired, by appropriate sizing of the bellows 120, for example, or for a given size bellows, by adjustment of the adjustable abutment 131.

As seen in FIG. 2, any fuel which may travel up the stem 66 of the throttle-nozzle 36 will enter an annulus chamber 135, defined by the wall of valve guide bore 67 and a reduced neck portion 66a of the stem, and be discharged therefrom by a vent passage 136 in partition wall 58 in communication at one end with the chamber 135 and at its other end with inlet passage 60.

What is claimed is:

1. A fuel atomizing nozzle for use in supplying a combustible induction mixture to an internal combustion engine, said fuel atomizing nozzle comprising a housing means having an aeriform fluid supply passage therethrough terminating at an annular inlet port on a first side thereof, said annular inlet port defining an annular valve seat adjacent said first side, said housing means having a stepped bore therethrough extending from a second side opposite said first side to said supply passage closely adjacent to and concentric with said inlet port, said stepped valve guide bore defining in sequence an annular first inner wall of a first diameter extending from said second side, an annular second inner wall of substantially greater diameter than said first inner wall and an annular third inner wall of a diameter greater than said first inner wall and less than said second inner wall, a throttle-nozzle having an annular conical head and an axial extending stem concentric therewith, said stem being positioned in said stepped valve guide bore and reciprocally journalled by said first inner wall with said stem extending out from said second side means, throttle actuating means operatively connected to said stem to effect operation of said throttle-nozzle whereby said head is moved relative to said valve seat to control the discharge of fluid through said inlet port, said stem defining with said second inner wall a first annulus chamber for fuel and defining with said third inner wall a reduced size annulus chamber for fuel and, a fuel passage means including a fuel pressure regulator connected at one end to said first annulus chamber and connectable at its other end to a source of liquid fuel under pressure.

2. A fuel atomizing nozzle according to claim 1 wherein said housing means includes a valve body means forming a part of said aeriform fluid supply passage, said valve body means having a cross bore therein, a valve plate rotatably positioned within said cross bore, said valve body means having a first hole extending from a first exterior surface of said valve body means to run out at said cross bore, said first hole being connectable to a source of ambient air, a second hole extending from a second exterior surface of said valve body means to run out at said cross bore in communication with said first hole, a third hole extending from a third exterior surface of said valve body means to run out at said cross bore, said third hole being connectable to a source of engine exhaust gas, and a contoured hole of continuous profile extending from said second exterior surface to run out at said cross bore in communication with said third hole and, linkage means operatively connecting said fuel pressure regulator to said valve plate to effect movement of said valve plate between an open position and a closed position relative to said contoured hole to control the flow from said third hole through said contoured hole.

3. A fuel atomizing nozzle according to claim 2 wherein said fuel passage means includes a fuel chamber in said housing connectable to the source of liquid fuel under pressure, a passage means including an orifice connecting said fuel chamber to said first annulus chamber, and wherein said fuel pressure regulator is a bellows type regulator positioned within said fuel chamber, said fuel pressure regulator including a cylindrical bellows means connected at one end to said housing means and having its other end movable relative to said orifice as a function of fuel pressure within said fuel chamber, a tapered metering rod fixed to said other end of said bellows means for movement therewith concentrically with respect to said orifice for controlling fuel flow from said fuel chamber through said orifice and wherein said linkage means includes a control pin slidably extending through said housing means into said bellows means to abut at one end against said other end of said bellows means for movement therewith.

4. A controlled exhaust gas fuel atomizing nozzle for an internal combustion engine having a carburetor for supplying air flowing from an air metering valve upstream thereof and for supplying fuel from a source of fuel under pressure to an induction passage, the carburetor having a throttle plate with at least one secondary throttle controlled opening therethrough positioned in the induction passage of the carburetor downstream of the air metering valve for controlling secondary air flow to an intake manifold of the engine and an exhaust passage for exhaust flow from the engine; said exhaust gas fuel atomizing nozzle including a housing means adapted to be positioned in the induction passage, said housing means having an inlet passage therein terminating at an induction port opening toward the intake manifold downstream of the throttle plate, a stepped valve guide bore in said housing means extending from said induction port through said housing means concentric with said induction port, a poppet valve movably supported in said housing means for movement between a first position partly blocking flow through said induction port to a second position permitting full flow through said induction port, said poppet valve including a stem slidably journalled in said stepped valve guide bore to extend from said housing means, said stem forming with said stepped valve guide bore a first annulus and a second annulus below said first annulus and in communication therewith, said second annulus being of a predetermined size and opening into said inlet passage directly above the head of said poppet valve, spring means operatively connected to said poppet valve to normally bias said poppet valve to said first position, lever means actuatable by an operator operatively connected to said poppet valve for effecting movement of said poppet valve toward said second position, an air passage connected at one end to said induction passage upstream of said secondary throttle controlled opening and downstream of the air metering valve and at its other end to said inlet passage, an exhaust gas recirculating line including an exhaust control valve means connected between said exhaust passage and said inlet passage, said exhaust control valve means having a scheduled flow path therethrough, a fuel valve means operatively connectable to the source of fuel for controlling fuel flow from a source of fuel under pressure to said first annulus as a function of fuel pressure, and said exhaust control valve means further including means responsive to movement of said fuel valve means for effecting operation of said exhaust control valve means as a function of fuel pressure sensed by said fuel valve means.

5. A controlled exhaust gas fuel atomizing nozzle for an internal combustion engine having a carburetor for supplying air flowing from an air metering valve upstream thereof and fuel from a source of fuel under pressure to an induction passage connected to the intake manifold for the engine, a throttle plate with at least one secondary throttle controlled opening therein in said induction passage for controlling air flow therethrough to the intake manifold, and an exhaust passage for exhaust gas flow from the engine, said atomizing nozzle including a housing means positioned in said induction passage, said housing means having an inlet passage therein terminating at an annular induction port opening toward said intake manifold downstream of the throttle plate, a stepped stem bore extending from one end of said housing through to said inlet passage adjacent to said induction port and concentric therewith, a poppet valve having a stem reciprocally journalled in said stepped stem bore and having a head positioned to control flow through said induction port, said stem extending from said housing means whereby said poppet valve can be reciprocated between a partly closed position and an open position relative to said induction port and forming with said stepped bore a first annulus of a predetermined size opening into said induction port and a second annulus of a diameter greater than said first annulus and in communication therewith, spring means operatively connected to said stem and to said housing means to normally bias said poppet valve to a first position blocking flow through said induction port, lever means operatively connected to said poppet valve and operatively connectable for actuation by an operator to effect movement of said poppet valve to a second position permitting flow through said induction port, an air-exhaust mixing valve means fixed to said housing means and having a scheduled air flow path therethrough for connecting said induction passage downstream of said air metering valve to said inlet passage and having a scheduled exhaust flow path therethrough for connecting said exhaust passage to said inlet passage, said air-exhaust mixing valve further including a valve shaft and a valve plate fixed thereon for pivotal movement to control flow through said scheduled exhaust flow path, said housing means having a fuel chamber therein connected to said source of fuel, an orifice passage extending from said fuel chamber to said second annulus, a spring bellows assembly fixed at one end in said chamber and having its opposite end freely movable as a function of fuel pressure within said chamber, a valve fixed to said opposite end of said bellows for movement therewith and positioned to control the flow of fuel from said fuel chamber through said orifice passage, a plunger slidably journalled in said bellows assembly and positioned with one end thereof abutting said opposite end of said bellows assembly and its opposite end extending from said housing means, and lever means operatively connected to said plunger and to said valve shaft to effect movement of said valve plate to effect opening and closing of said scheduled exhaust flow path whereby an scheduled ratio of exhaust gas recirculation to air inlet flow through said passage to effect vaporization of fuel discharged from said first annulus is effected as fuel pressure increases.

* * * * *